United States Patent
Grosser et al.

(10) Patent No.: US 7,733,899 B1
(45) Date of Patent: Jun. 8, 2010

(54) METHODS, SYSTEMS, AND COMPUTER PROGRAM PRODUCTS FOR RATE-BASED DISTRIBUTION OF LAYER 2 PACKETS FOR IN-LINE PROCESSING AT A LAYER 2 PACKET FORWARDING DEVICE AT A TRANSMISSION RATE LESS THAN A RECEIVED TRANSMISSION RATE

(75) Inventors: Donald B. Grosser, Apex, NC (US); Scott Hubbard, Santa Clara, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 553 days.

(21) Appl. No.: 11/643,564

(22) Filed: Dec. 21, 2006

(51) Int. Cl.
*H04J 3/16* (2006.01)

(52) U.S. Cl. .................................... 370/465

(58) Field of Classification Search .............. 370/465, 370/477, 389, 390
See application file for complete search history.

(56) References Cited

U.S. PATENT DOCUMENTS

| | | | |
|---|---|---|---|
| 6,473,424 B1 * | 10/2002 | DeJager et al. ............ 370/389 |
| 2006/0013182 A1 * | 1/2006 | Balasubramanian et al. 370/343 |
| 2006/0095970 A1 * | 5/2006 | Rajagopal et al. ............ 726/25 |
| 2006/0104271 A1 * | 5/2006 | Samudra ..................... 370/389 |
| 2007/0168475 A1 * | 7/2007 | Mullahy et al. ............. 709/220 |

\* cited by examiner

*Primary Examiner*—Derrick W Ferris
*Assistant Examiner*—Mohammad Anwar
(74) *Attorney, Agent, or Firm*—Jenkins, Wilson, Taylor & Hunt, P.A.

(57) ABSTRACT

The subject matter described herein includes methods, systems, and computer program products for rate-based distribution of layer 2 packets for in-line processing at a layer 2 packet forwarding device. According to one aspect, the subject matter described herein includes a method for distributing layer 2 packets for in-line processing at a transmission rate less than a received transmission rate. The method includes receiving an input stream of layer 2 packets at an input port of a layer 2 packet forwarding device. The input port has a first transmission capacity. The input stream of layer 2 packets is divided into at least two substreams of layer 2 packets of different transmission rates. The first substream of layer 2 packets is layer 2 redirected to a first set of output ports of a slower transmission capacity than the input port. The second substream of layer 2 packets is flooded to a second set of output ports, with a transmission capacity equal to the first set of output ports. The transmission rates of the first and second substreams of layer 2 packets are selected to optimize the load sharing among the first and second sets of output ports.

15 Claims, 2 Drawing Sheets

METHODS, SYSTEMS, AND COMPUTER PROGRAM PRODUCTS FOR RATE-BASED DISTRIBUTION OF LAYER 2 PACKETS FOR IN-LINE PROCESSING AT A LAYER 2 PACKET FORWARDING DEVICE AT A TRANSMISSION RATE LESS THAN A RECEIVED TRANSMISSION RATE

TECHNICAL FIELD

The subject matter described herein relates to distributing layer 2 packets. More particularly, the subject matter described herein relates to methods, systems, and computer program products for rate-based distribution of layer 2 packets for in-line processing at a layer 2 packet forwarding device at a transmission rate less than a received transmission rate.

BACKGROUND

In conventional networks, it may be desirable for layer 2 packet forwarding devices, such as bridges or switches, to be capable of interfacing with a variety of in-line processors. Yet many conventional in-line processors cannot process packet streams at the transmission rates typically employed by current high-speed networks. Therefore, conventional layer 2 packet forwarding devices typically divide high-speed packet streams of layer 2 packets into several lower-speed packet streams that are sent to several lower-speed in-line processors. In order to ensure that the low-speed substreams do not exceed the capacity of any individual in-line processor, the substreams may be load-shared using either software-based or hardware-based methods. Both conventional methods include receiving packets at a first transmission rate and forwarding them to a set of output ports of a transmission rate less than the first transmission rate.

Software-based methods for dividing streams of packets can include using hashing algorithms to divide high-speed packet streams by examining parameters within packets of an input packet stream. Typical software-based hashing algorithms utilize one or more bits included in the layer 2 and/or layer 3 fields of a packet, such as a portion of a media access control (MAC) address or an IP address, in order to generate a key (hash) and direct the packet to particular output port among a set of output ports. Generally, hashing algorithms employed in layer 2 packet forwarding devices extract information from the MAC address of a packet and perform a mathematical operation on the extracted information in order to generate a key that identifies the packet. Ideal hashing algorithms generate keys that uniquely identify each packet, while non-ideal hashing algorithms can generate a single key that identifies two or more packets. In such a case, a "collision" occurs and additional processing is required to identify the packet. In a layer 2 packet forwarding device using a software-based hashing algorithm to divide a packet stream, processing resources are dedicated to extracting information from each packet received and performing mathematical operations on the extracted information.

One problem with current layer 2 packet forwarding devices that use software-based hashing algorithms to divide packet streams is that these devices are not capable of dividing and load-balancing a high-speed packet stream into a set of output packet streams at wireline speeds. For example, a layer 2 packet forwarding device using a software-based hashing algorithm to divide a 10 Gb/sec input packet stream (received at a 10 Gb/sec input port) into 10×1 Gb/sec output packet streams (output to 10×1 Gb/sec output ports) could not divide the streams at the full 10 Gb/sec, without dropping packets. Moreover, imbalances in the output packet streams produced by the load-sharing algorithm would also result in dropped packets.

Hardware-based methods achieve wireline speeds by avoiding the mathematical operations performed by software-based hashing algorithms. Hardware-based methods typically divide and load-share a high-speed input packet stream into output packet streams by evenly dividing a portion of each packet's MAC address into the number of output streams. Typically, the 8 least significant bits of each packet's MAC address are used to divide layer 2 packet streams. The minimum number of bits examined must be sufficient to uniquely identify each output packet stream. For example, in Table 1 below, in order to divide a single input packet stream into 10 output packet streams, examination of at least 4 bits of a MAC address are required. The result is that 16 (i.e. $2^4$) numbers must be reduced to 10 corresponding ports in order to evenly divide a packet stream into 10 output ports. If the resulting packet streams are not balanced, packets are dropped when all ports are under full load.

TABLE 1

| 1 | 2 | 3 | 4 | 5 | 6 | 7 | 8 | 9 | 10 |
|---|---|---|---|---|---|---|---|---|----|
| 0000 | 0001 | 0010 | 0011 | 0100 | 0101 | 0110 | 0111 | 1000 | 1001 |
| 1 | | 2 | | 3 | | 4 | | 5 | |
| 9 | 10 | 11 | 12 | 13 | 14 | 15 | 16 | | |
| 1000 | 1001 | 1010 | 1011 | 1100 | 1101 | 1110 | 1111 | | |
| 5 | | 6 | | 7 | | 8 | | 9 | 10 |

As illustrated in Table 1 above, the 16 possibilities generated as a consequence of expressing 10 in binary format cannot be evenly reduced to 10 output streams. The result is a set of unbalanced output packet streams resulting in dropped packets under the conditions described above. Thus, in order to maintain ideal load-sharing among output ports at wireline speeds, hardware-based methods require transmission capacities of the input and output ports equal powers of 2.

Thus, conventional packet forwarding devices cannot divide a stream of layer 2 packets into multiple substreams at wireline speeds unless the number of substreams equals a power of 2. Accordingly, a need exists for improved methods, systems, and computer program products for rate-based distribution of layer 2 packets for in-line processing at a layer 2 packet forwarding device.

SUMMARY

The subject matter described herein includes methods, systems, and computer program products for rate-based distribution of layer 2 packets for in-line processing at a layer 2 packet forwarding device. According to one aspect, the subject matter described herein includes a method for distributing layer 2 packets for in-line processing at a transmission rate less than a received transmission rate. The method includes receiving an input stream of layer 2 packets at an input port of a layer 2 packet forwarding device. The input port has a first transmission capacity. The input stream of layer 2 packets is divided into at least two substreams of layer 2 packets of different transmission rates, each being less than or equal to the first transmission rate. The first substream of layer 2 packets is layer 2 redirected to a first set of output ports of a slower transmission capacity than the input port. The second substream of layer 2 packets is flooded to a second set of output ports, with a transmission capacity equal to the first set of output ports. The transmission rates of the first and second substreams of layer 2 packets are selected to optimize the load sharing among the first and second sets of output ports.

The subject matter described herein for rate-based distribution of layer 2 packets for in-line processing at a layer 2 packet forwarding device may be implemented in hardware, software, firmware, or any combination thereof. In one exemplary implementation, the subject matter described herein may be implemented using a computer program product comprising computer executable instructions embodied in a computer readable medium. Exemplary computer readable media suitable for implementing the subject matter described herein include disk memory devices, chip memory devices, programmable logic devices, and application specific integrated circuits. In addition, a computer program product that implements the subject matter described herein may be implemented on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
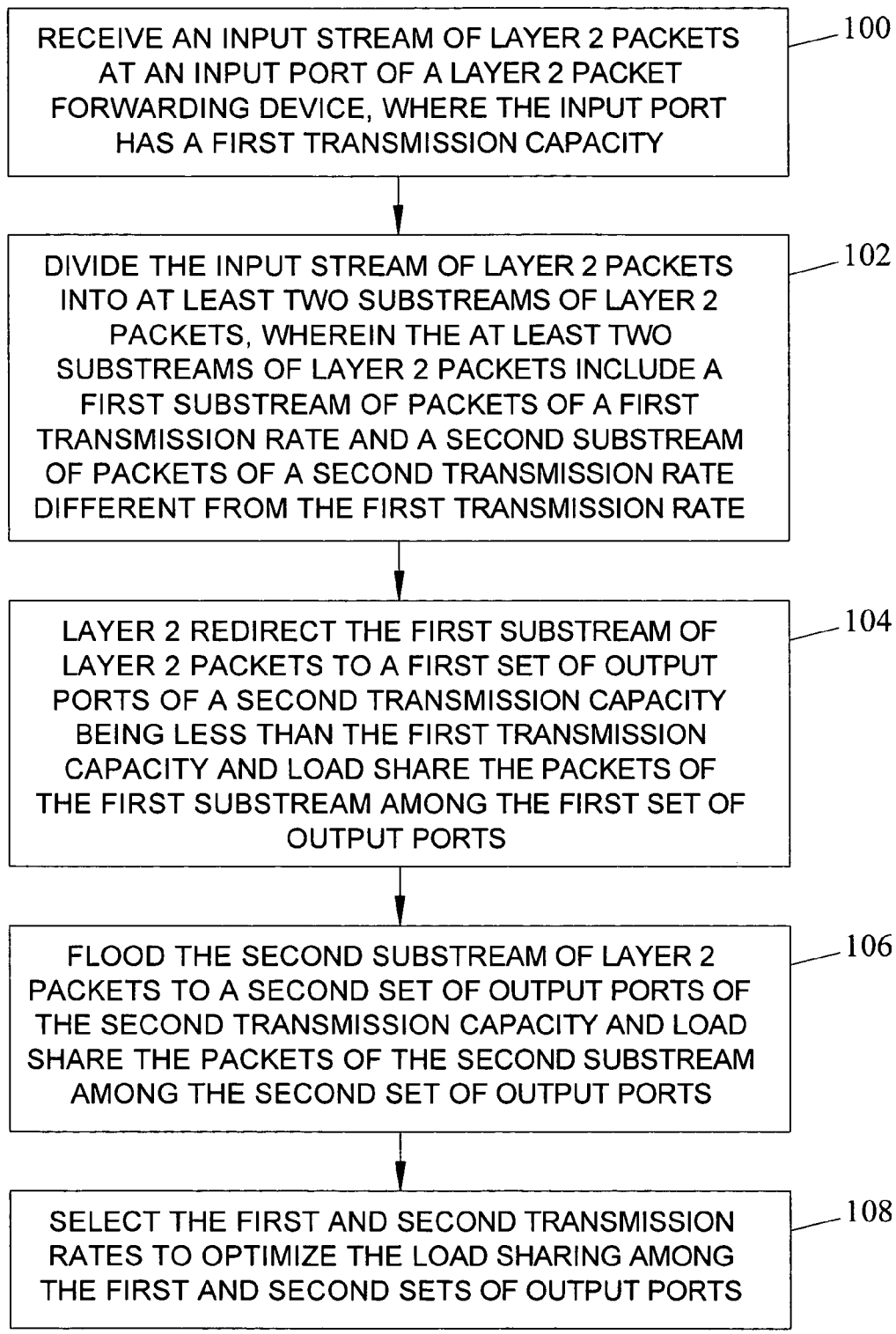
FIG. 1 is a flow chart illustrating exemplary steps for distributing layer 2 packets for in-line processing at a transmission rate less than a received transmission rate according to an embodiment of the subject matter described herein.
Figure 2:
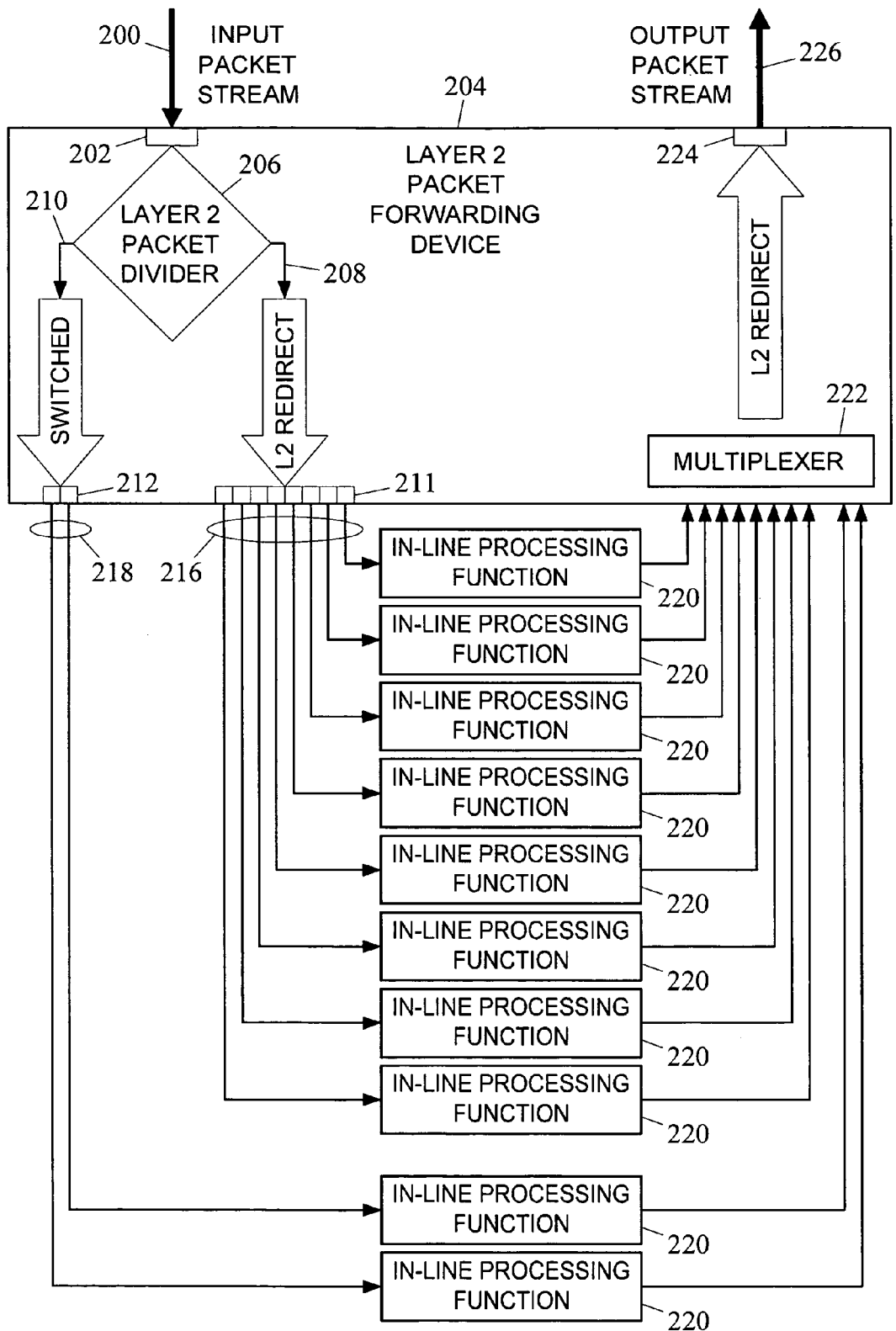
FIG. 2 is a block diagram illustrating a system for distributing layer 2 packets for in-line processing at a transmission rate less than a received transmission rate according to an embodiment of the subject matter described herein.

FIGS. 1 and 2 are a flow chart and block diagram illustrating an exemplary process and a system for distributing layer 2 packets for in-line processing at a transmission rate less than a received transmission rate according to an embodiment of the subject matter described herein. Referring to FIGS. 1 and 2, in step 100, an input stream of layer 2 packets 200 is received at input port 202 of a layer 2 packet forwarding device 204. Input port 202 may have a first transmission capacity. After being received by input port 202, in step 102, input packet stream 200 is divided into two layer 2 packet substreams 206 and 208 by a layer 2 packet divider 206, where the substreams each have transmission rates less than the transmission rate of input stream 200. The embodiment illustrated in FIG. 2 includes dividing input packet stream 200 into two packet substreams 208 and 210. However, in other embodiments, packet divider 206 may divide input packet stream 200 into more than two packet streams. According to the illustrated embodiment, layer 2 packet divider 206 includes a rate-based meter for measuring the transmission rate of input packet stream 200 and dividing it into packet substreams 208 and 210 based on the measured transmission rate.

After input stream 200 is divided into at least two substreams of layer 2 packets 208 and 210 in step 102, packet substream 208 is layer 2 redirected to a first set of output ports 211 according to step 104. Layer 2 redirection overrides normal bridge rules for directing packet stream 208 to set of output ports 211. Normal bridge rules include discarding, forwarding, or flooding a packet depending on the packet's destination. Because layer 2 packet forwarding devices route packets between different local area networks (LANs), normal bridge rules include discarding a packet if the source and destination addresses of a layer 2 packet received by a bridge are the same because the packet is already located on the correct LAN. If the source and destination addresses are different, normal bridge rules include forwarding the packet to the proper destination. Finally, if the destination address of a packet is unknown, normal bridge rules include flooding the packet to all outbound ports in order to ensure that the packet reaches its destination. Upon arriving at its destination, a message indicating the correct port is sent back to the bridge, and the appropriate output port for forwarding subsequent packets intended for the same destination is learned. Normal bridge rules include flooding packets to all output ports under many circumstances, and therefore, many duplicate packets are produced. When the transmission capacities of input and output ports 202, 211 and 212 are fully utilized, flooding packets to multiple ports must be avoided in order to avoid exceeding the capacity of the output ports and consequentially dropping packets. Layer 2 redirection overrides these normal bridge rules and therefore avoids unwanted port flooding of layer 2 packets.

Returning to step 104, layer 2 redirection of packet substream 208 includes directing packets to a first set of output ports 211 and generating a first set of packet streams 216. The output ports comprising first set of output ports 211 may include ports with identical transmission capacities or may include ports with varying capacities. In one embodiment, output ports 211 are trunked or bonded in order to create a single logical link from multiple individual physical links. The process of port trunking can also include load-sharing packets among links 216, and will be described in more detail later.

Returning to FIG. 1, in step 106, output packet stream 210 is flooded to output ports 212. As described above, packet flooding includes forwarding copies of packets to all ports in a particular LAN except the input port the packets were received on (the ingress port). Packet flooding to multiple ports produces multiple packet copies, only one of which must reach the proper destination. In one embodiment, a virtual local area network (VLAN) is created to include input port 202 and second set of output ports 212 in order to reduce the number of non-ingress ports to one. Because output ports 212 are port trunked, the multiple physical ports that comprise the second set of output ports 212 appear as a single logical output port within the VLAN. Thus, when packets are flooded within the VLAN, the only non-input port becomes logical output port 212. Therefore, in step 106, packet substream 210 is forwarded from input port 204 to logical output port 212 and no duplicate packets are generated by conventional packet flooding rules.

In step 108, packet divider 206 selects the transmission rate of the first and second packet substreams 208 and 210 to optimize the load-sharing among the first and second sets of output ports 212 and 214. In one implementation, packets received at input port 202 of a transmission rate less than the combined transmission capacity of the first set of output ports 211 are layer 2 redirected to ports 211, and no packets are directed to second set of output ports 212. Packets received that exceed the transmission capacity of the first set of output ports 211 are directed to second set of output ports 212. For example, if input packet stream 200 has a transmission rate of 7 Gb/sec, and the combined transmission capacity of ports 211 is 8 Gb/sec (8×1 Gb/sec ports) then packet stream 200 would be entirely layer 2 redirected to ports 211. In another example, if input packet stream 200 has a transmission rate of 9 Gb/sec, an 8 Gb/sec packet stream 208 would be layer 2 redirected to ports 211 and a 1 Gb/sec packet stream 210 would be flooded to ports 212 (within a VLAN).

This method may be applied to load-sharing packets 208 among ports 211 into packet streams 216 by first directing packets to a first output port until its transmission capacity is filled, and directing a next set of packets to a next output port until its transmission capacity is filled. In another implementation, packet substream 208 may be divided equally among output ports 214 using a load-balancing algorithm rather than the more general load-sharing algorithm described above. For input packet streams with transmission rates less than the transmission capacity of the layer 2 packet forwarding device, load-balancing is not critical. When the transmission capacity of layer 2 packet forwarding device 204 is fully utilized, the lower-speed packet substreams must be load-balanced in order to avoid exceeding the capacity of an individual link and thus dropping packets.

In one implementation, the algorithm used to load share packets among the first and second sets of output ports may be based on a power of two because the number of ports in each set is equal to a power of two. Accordingly, selecting the first and second transmission rates to optimize the load sharing among the first and second sets of output ports may include selecting the first and second rates each to be equal to an integer multiple of a power of two. For example, an input stream of 10 Gbps may be divided into streams of 8 Gbps and 2 Gbps.

According to one embodiment, load-shared packet substreams 216 and 218 may be forwarded to in-line processors 216, which may perform a variety of processing functions. In-line processors 220 may perform functions including but not limited to encryption, intrusion detection (ID), or intrusion prevention (IP). ID/IP devices 220 may include inspecting packets for viruses, denial of service (DOS) attacks, or worms. In-line processors 220 may be located internally or externally to packet forwarding device 202.

Packet substreams 212-214 may also be multiplexed by multiplexer 222 into an output stream 222 having a transmission rate that is the sum of the transmission rates of packet substreams 216-218. Output stream 222 is layer 2 redirected to output port 224 according to the layer 2 redirection rules described in reference to packet stream 208 above. In one embodiment, the transmission capacity of output port 224 may be equal to the transmission capacity of input port 202, thereby in-line processing a high-speed layer 2 packet stream using multiple low-speed processors at wireline speeds without requiring that the transmission rates or transmission capacities be powers of two.

It will be understood that various details of the invention may be changed without departing from the scope of the invention. Furthermore, the foregoing description is for the purpose of illustration only, and not for the purpose of limitation.

What is claimed is:

1. A method for distributing layer 2 packets for in-line processing at a transmission rate less than a received transmission rate, the method comprising:
   (a) receiving an input stream of layer 2 packets at an input port of a layer 2 packet forwarding device, the input port having a first transmission capacity;
   (b) dividing the input stream of layer 2 packets into at least two substreams of layer 2 packets, wherein the at least two substreams of layer 2 packets include a first substream of packets of a first transmission rate and a second substream of packets of a second transmission rate different from the first transmission rate;
   (c) layer 2 redirecting the first substream of layer 2 packets to a first set of output ports of a second transmission capacity being less than the first transmission capacity and load sharing the packets of the first substream among the first set of output ports, wherein layer 2 redirecting the first substream includes avoiding flooding of the first substream of layer 2 packets to the first set of output ports;
   (d) flooding the second substream of layer 2 packets to a second set of output ports of the second transmission capacity and load sharing the packets of the second substream among the second set of output ports, wherein the second set of output ports are trunked or bonded to create a single logical port from multiple individual physical ports and wherein the second set of output ports and the input port belong to the same virtual local area network (VLAN) to reduce the number of non-ingress ports, for flooding purposes, to a single port; and
   (e) wherein the first and second transmission rates are selected to optimize the load sharing among the first and second sets of output ports.

2. The method of claim 1 comprising:
   (a) applying in-line processing to the first and second substreams of layer 2 packets; and
   (b) multiplexing the first and second substreams of layer 2 packets output from in-line processing into an output stream at the sum of the first and second transmission rates and forwarding the output stream to an output port of the first transmission capacity.

3. The method of claim 1 wherein the transmission rates of the first and second substreams of layer 2 packets are each integer multiples of a power of two.

4. The method of claim 1 wherein the first and second sets of output ports each include a number of individual ports equal to a power of two.

5. The method of claim 2 wherein the in-line processing comprises encryption.

6. The method of claim 2 wherein the in-line processing comprises intrusion detection (ID).

7. The method of claim 2 wherein the in-line processing comprises intrusion prevention (IP).

8. A system for distributing layer 2 packets for in-line processing at a transmission rate less than a received transmission rate, the system comprising:
   a layer 2 packet forwarding device including:
   (a) at least one input port of a first transmission capacity for receiving an input stream of layer 2 packets;
   (b) at least two sets of output ports, wherein the at least two sets of output ports include a first and a second set of output ports of a second transmission capacity being less than the first transmission capacity;
   (c) a layer 2 packet stream divider for dividing the input stream of layer 2 packets into at least two substreams of layer 2 packets, wherein the at least two substreams of layer 2 packets include a first substream of layer 2 packets of a first transmission rate and a second substream of layer 2 packets of a second transmission rate different from the first transmission rate;
   (d) a layer 2 packet redirection function for layer 2 redirecting the first substream of layer 2 packets to the first set of output ports and load sharing the packets of the first substream among the first set of output ports, wherein layer 2 redirecting the first substream includes avoiding flooding of the first substream of layer 2 packets to the first set of output ports; and
   (e) a layer 2 packet forwarding function for flooding the second substream of layer 2 packets to the second set of output ports and load sharing the packets of the second substream among the second set of output ports, wherein the second set of output ports are trunked or bonded to create a single logical port from multiple individual physical ports and wherein the second set of output ports and the input port belong to the same virtual local area network (VLAN) to reduce the number of non-ingress ports, for flooding purposes, to a single port.

9. The system of claim 8 comprising:
(a) at least one in-line processor for applying in-line processing function to the first and second substreams of layer 2 packets; and
(b) a multiplexing function for multiplexing the first and second substreams of layer 2 packets output from in-line processing into an output stream at the first transmission rate and forwarding the output stream to an output port of the first transmission capacity.

10. The system of claim 8 wherein the transmission rates of the first and second subsets of layer 2 packets are each integer multiples of a power of two.

11. The system of claim 8 wherein the first and second sets of output ports each include a number of individual ports equal to a power of two.

12. The system of claim 9 wherein the at least one in-line processing function includes an encryption function.

13. The system of claim 9 wherein the at least one in-line processing function includes an intrusion detection (ID) function.

14. The system of claim 9 wherein the at least one in-line processing function includes an intrusion prevention (IP) function.

15. A computer program product comprising computer-executable instructions embodied in a computer-readable medium for performing steps comprising:

(a) receiving an input stream of layer 2 packets at an input port of a layer 2 packet forwarding device, the input port having a first transmission capacity;
(b) dividing the input stream of layer 2 packets into at least two substreams of layer 2 packets, wherein the at least two substreams of layer 2 packets include a first substream of packets of a first transmission rate and a second substream of packets of a second transmission rate different from the first transmission rate;
(c) layer 2 redirecting the first substream of layer 2 packets to a first set of output ports of a second transmission capacity being less than the first transmission capacity and load sharing the packets of the first substream among the first set of output ports, wherein layer 2 redirecting the first substream includes avoiding flooding of the first substream of layer 2 packets to the first set of output ports;
(d) flooding the second substream of layer 2 packets to a second set of output ports of the second transmission capacity and load sharing the packets of the second substream among the second set of output ports, wherein the second set of output ports are trunked or bonded to create a single logical port from multiple individual physical ports and wherein the second set of output ports and the input port belong to the same virtual local area network (VLAN) to reduce the number of non-ingress ports, for flooding purposes, to a single port; and
(e) wherein the first and second transmission rates are selected to optimize the load sharing among the first and second sets of output ports.

* * * * *